Oct. 14, 1952  J. J. McLAUGHLIN  2,613,788
TELESCOPING CONVEYER LINE
Filed Dec. 2, 1949  5 Sheets-Sheet 1
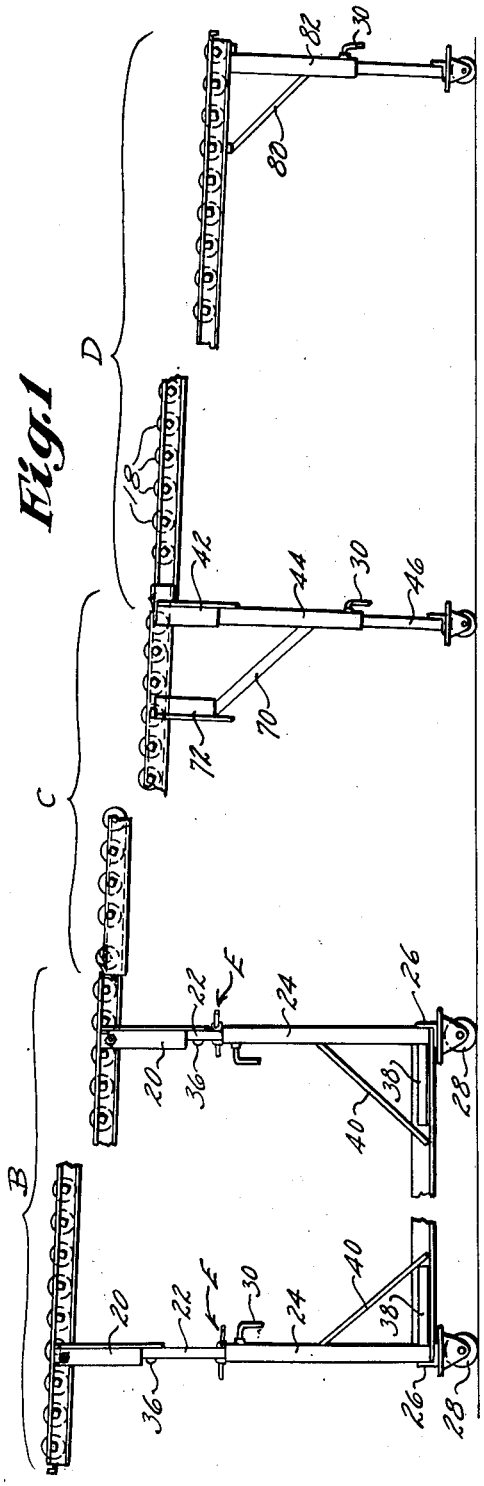
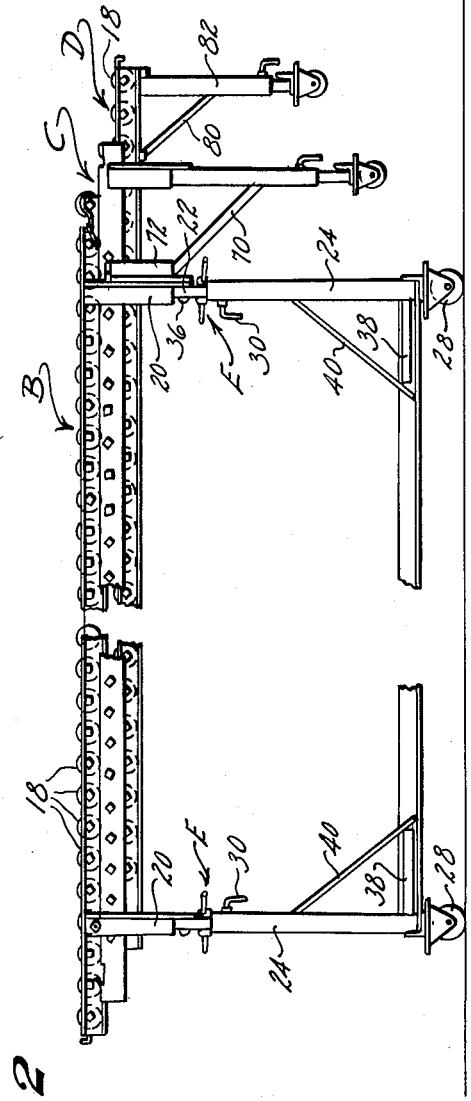
INVENTOR.
John J. McLaughlin
BY
Harry Langsam
Attorney Oct. 14, 1952 J. J. McLAUGHLIN 2,613,788
TELESCOPING CONVEYER LINE
Filed Dec. 2, 1949 5 Sheets-Sheet 2
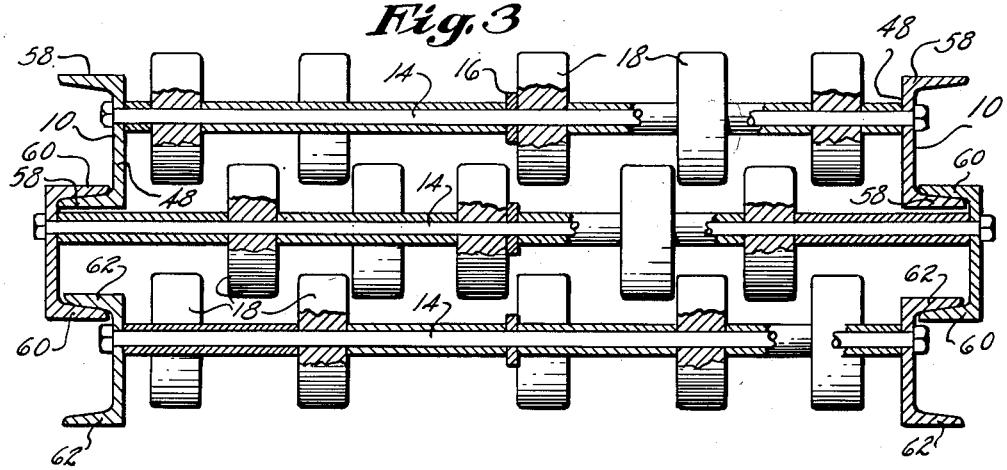
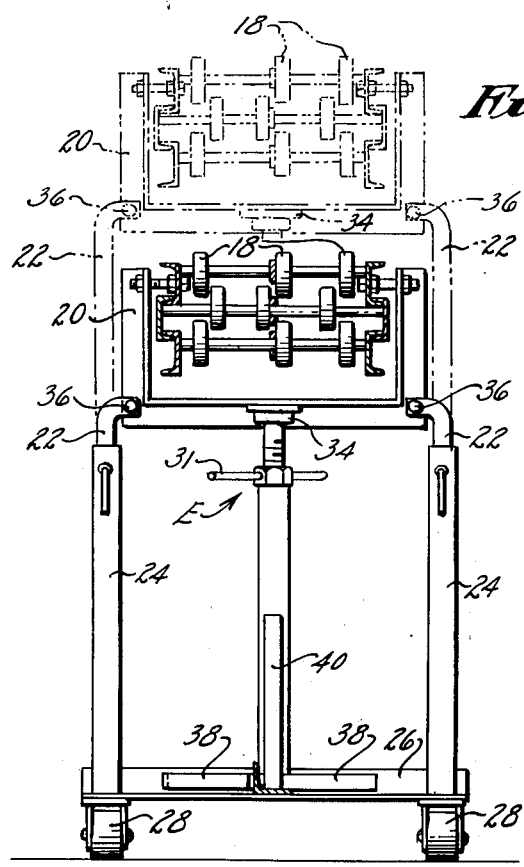
INVENTOR.
John J. McLaughlin
BY
Harry Langsam
Attorney

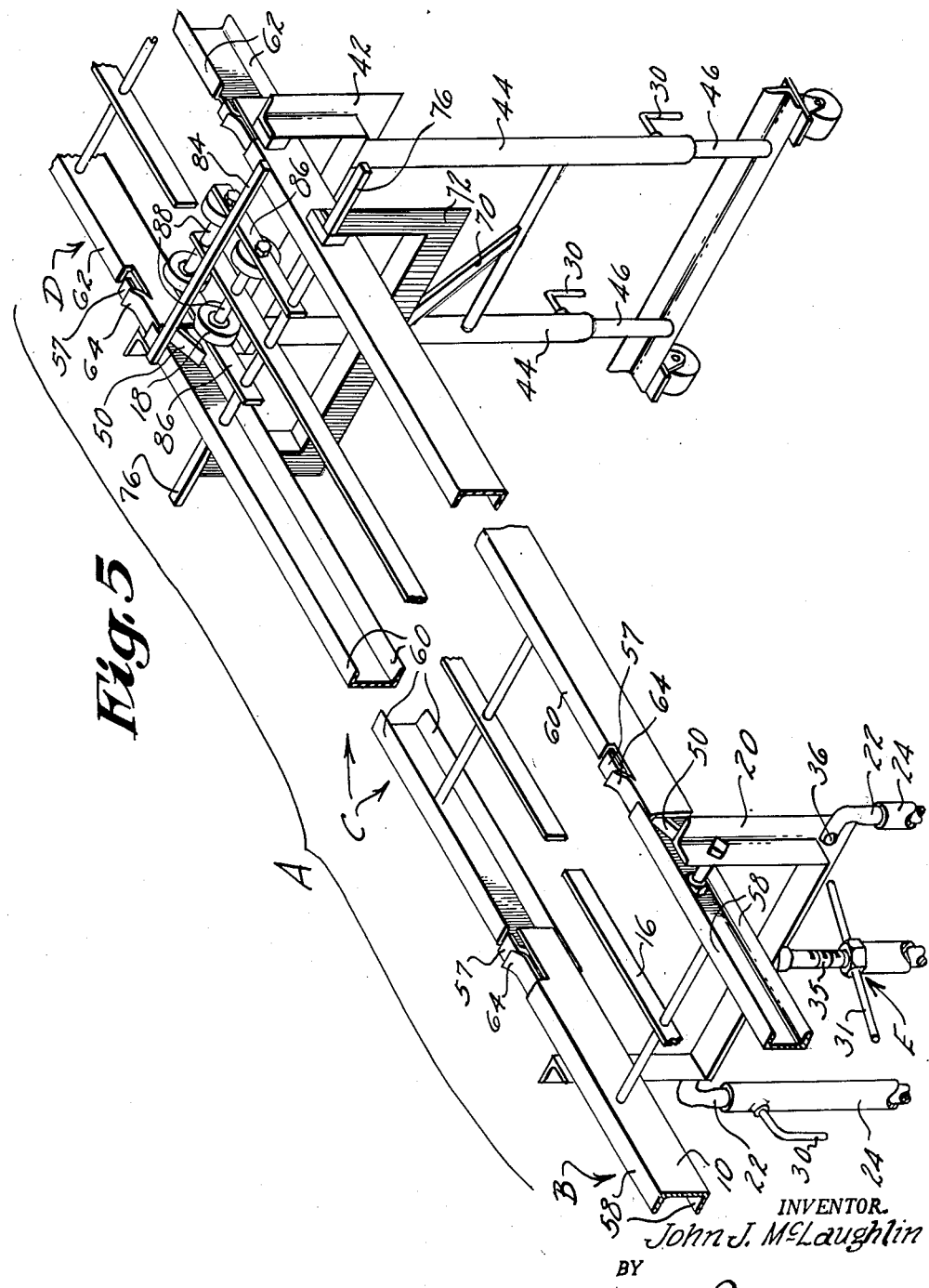

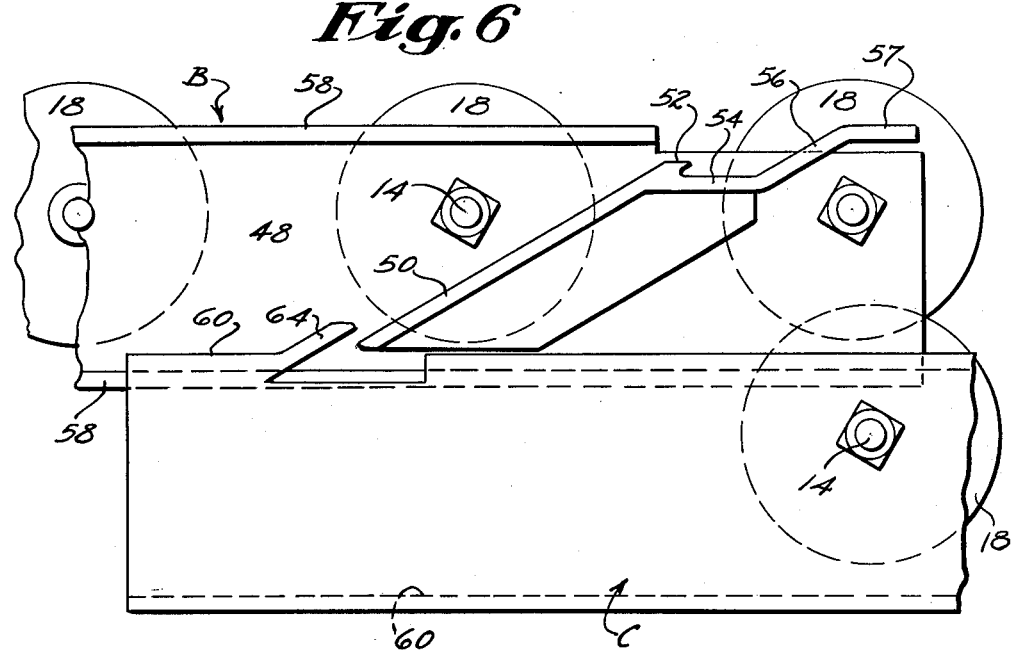
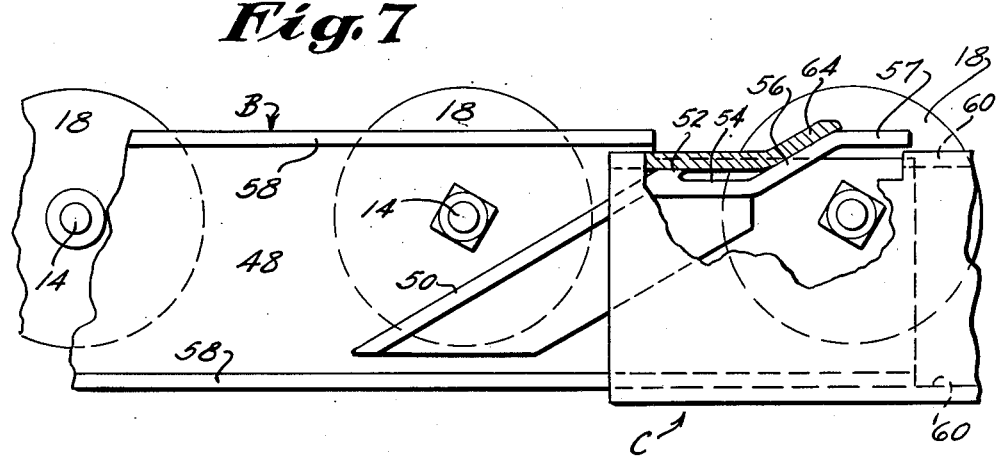

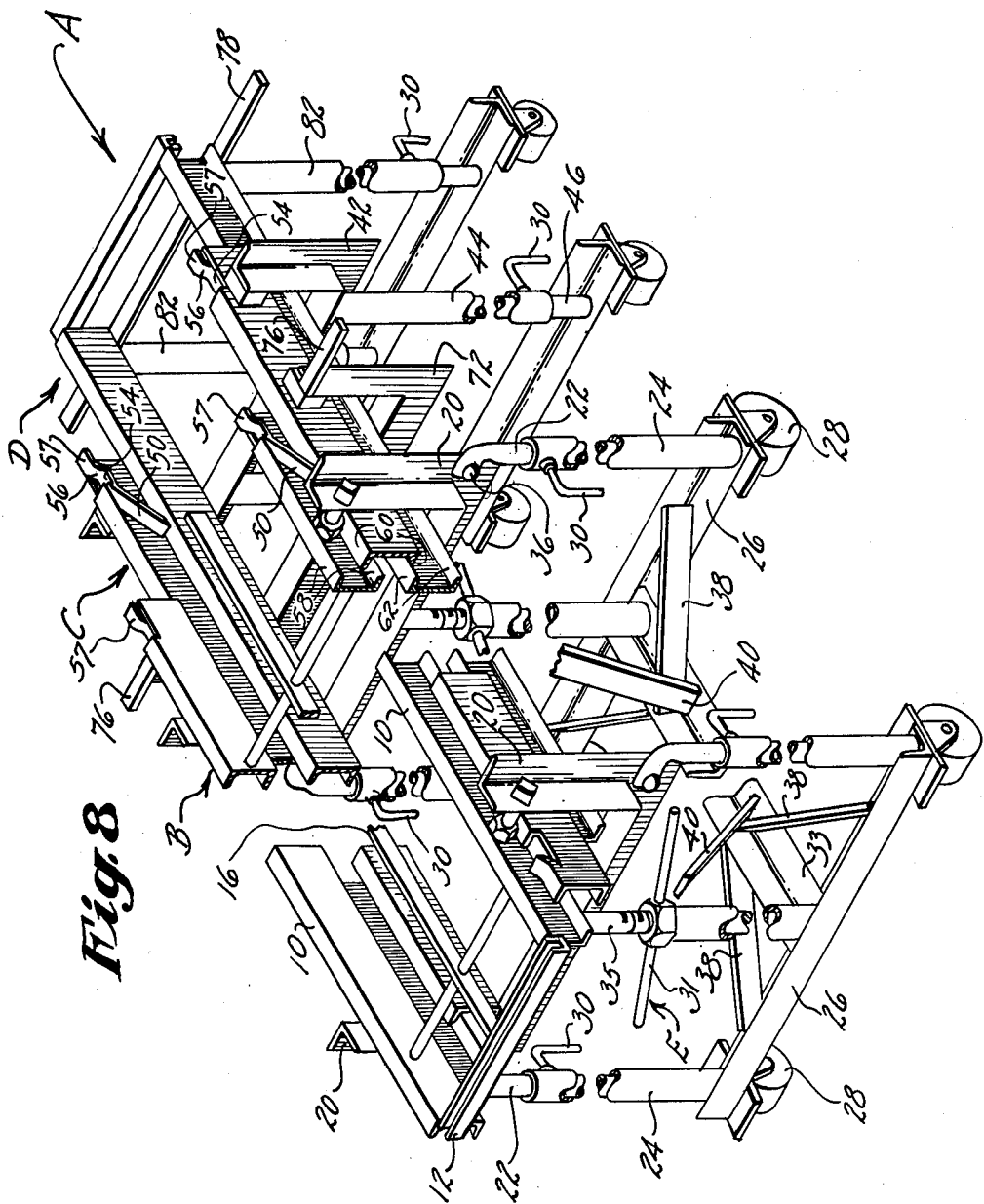

Patented Oct. 14, 1952

2,613,788

UNITED STATES PATENT OFFICE 2,613,788

TELESCOPING CONVEYER LINE

John J. McLaughlin, Philadelphia, Pa., assignor to The Wilkie Company, a partnership comprising John J. McLaughlin and Harvey Yellin, Philadelphia, Pa.

Application December 2, 1949, Serial No. 130,761

4 Claims. (Cl. 193—35)

My invention relates to gravity feed "skate wheel" conveyor lines, and is directed particularly to a sectional conveyor line whose sections telescope together for storing. The invention is, in part, a continuation of my previous application, Serial No. 721,909, filed January 19, 1947.

Some of the sectional conveyor lines heretofore manufactured have provisions for telescoping; but these provisions have attendant drawbacks which reduce their usefulness. In one type of telescoping line, the sections nest one within the next. This requires that the sections be of progressively smaller width, and for a line of any length, the extreme end sections are very wide and very narrow, respectively.

In a second type of telescoping conveyor line shown in my previous application, all the sections have the same width and have individual stands attached. The sections are slung one under the next, for telescoping. In use, the sections are extended, suitable stops being provided at the section ends to prevent the sections from uncoupling. The drawback to the use of this line is that the sections have different elevations, creating a step at the junction of any two sections.

In travelling over these steps, the conveyed packages are bumped and defaced; also, the conveyor line can only feed in one direction, and must be swung around to change this direction.

Therefore, an object of my invention is to provide a telescoping conveyor line utilizing sections all having one width which sections extend to form a continuous line without steps at the joints.

Another object of the invention is to provide a telescopic conveyor line whose inclination may be varied.

Another object of the invention is to provide a conveyor whose bed can be levelled on an uneven floor.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawings in which:

Fig. 1 is a fragmentary side elevation of a conveyor line comprising three sections shown in the extended position.

Fig. 2 is a fragmentary side elevation of the conveyor line of Fig. 1, shown in the closed position.

Fig. 3 is a sectional view of the conveyor line sections when telescoped together.

Fig. 4 is an elevation view of one end of the telescoped conveyor, showing in phantom outline the position occupied by the bed when raised.

Fig. 5 is a fragmentary perspective view of the extended conveyor bed, showing the end couplings. Portions of the bed frame and wheels have been omitted for clarity.

Fig. 6 is an enlarged fragmentary side elevation of the end couplings of two successive sections incompletely extended, showing the sections at different levels.

Fig. 7 is a side elevation of the members of Fig. 6 showing the sections fully extended and both lying in the same level.

Fig. 8 is a fragmentary perspective view of the complete three-section conveyor in telescoped position. Portions of the sections are broken away to expose the interior structure.

Referring now to the drawings, wherein similar reference characters designate similar parts, I show a telescoping, gravity-feed conveyor line A, comprising a plurality of conveyor sections. The conveyor may be made up of any number of sections; however, for purpose of illustration, I show a conveyor of reasonable length comprising the three sections designated as B, C, and D, respectively. Section B is the main section, having ground supports at both ends, and this section contains all the other sections when the conveyor is telescoped. The section B comprises a bed frame, consisting of two parallel channel members 10 having a cross channel 12 at one end, with a plurality of transverse wheel or roller axles 14 intermediate of the ends. A longitudinal bar 16 extends midway between the channel members 10 and parallel thereto, and this bar 16 supports all the wheel axles 14 at their midsections. A plurality of skate wheels 18 are located at regular intervals upon each axle 14.

The bed frame of section B is bolted within a U-shaped yoke 20 at each end, each yoke being supported upon two vertical posts 22 which telescope within vertical pipes 24. The pipes 24 are connected by a cross member 26, which has a ground caster wheel 28 at each end. The elevation of each vertical post is maintained by a screw handle 30 which threads into the wall of each pipe 24, and bears against the post. Since the weight of the telescoped conveyor bed is considerable, I provide a vertically-acting screw jack E at the middle of each cross member 26, having a handle 31 for elevating either end of section B.

A longitudinal angle beam 33 connects the cross members 26, forming an undercarriage for section B. As shown in Fig. 4, the lower end 29 of the jack stands upon the angle beam 33, while the upper end 35 of the jack bears against the yoke bottom 32.

The vertical posts 22 are rigidly connected to the corners of the yoke at points 36. The screw handles 30 lock the posts in position.

A number of diagonally-extending braces 38 and 40 connect the frame members of the undercarriage for strength and rigidity.

The second and third sections, designated as C and D, respectively, are similar to each other and consist of a bed frame similar to the bed frame of section B. However, as shown best in Fig. 3, the flanges of the side channel members of the successive sections are oppositely directed, so that they interfit in a longitudinally slidable manner, permitting the sections to telescope. Thus, side channels of sections B and D have their flanges 58 and 62 respectively directed outwardly, while the flanges 60 of the side channels of section C are directed inwardly. The wheels of each section are horizontally staggered as shown, to permit telescoping without interference.

Sections C and D each have one end slidably supported from the preceding section. Section C has its other end supported within a yoke 42 which rests upon a pair of vertical pipes 44 having telescoping posts 46 within, which can be locked at various elevations by screw handles in the manner described for section B. For rigidity, diagonal braces 70 connect the vertical pipes 44 to an auxiliary yoke 72, and an arm 76 projects from each side thereof, for the user to grasp when pulling out the section.

Section D also has a projecting arm, designated as 78, for pulling out the section, and has diagonal braces 80 connecting the vertical pipes, 82 to the bed frame sides. A cross-channel 83 connects the side channels together.

The means for extendably coupling the sections at level is shown best in Figs. 6 and 7. It is assumed that the upper section is B, and the lower section is C, however, a similar construction exists between any two successive sections in the conveyor. A pair of plates are edge-welded to the web 48 of channel 10 near the end. These plates form an inclined plane 50, a narrow base 52, a horizontal portion 54, an incline and an over-lap 56, 57. A portion of the upper flange 58 of channel 10 is cut away. The upper flange 60 of section C has an inclined lug 64 struck upwardly therefrom, which lug, as the section is pulled out, engages and rides up on inclined plane 50. When the lug abuts incline 56 further extension is arrested as shown in Fig. 7. The inclined lug 64 of section C abuts the incline 56 of section B, while the flange 60 rests upon the narrow base 62; however, a slight overhang of the free edge of flange 60 adjacent the edge 60A of the channel C would tend to abut the flange 58 adjacent its free edge 58A. Hence, in telescopic arrangement the channel sections B and C are limited from moving in an extended horizontal direction and in a vertical direction. However, the channels may be pushed together to lower the channel C with respect to the channel B.

The wheels adjacent the section couplings are supported without joining the axles to the side channels, which would be impossible since the inclined plates of the coupling are welded to the inner face of the channel web, and would interfere with full-size axles. This is done by using a cross bar 84 to support the ends of ribs 86, which in turn carry a plurality of short roller axles 88.

It will be noted that the cross-channels 12 and 83 which lie at opposite ends of the conveyor line A are reversed, that is, the open side of channel 12 is directed up and the open side of channel 83 is directed down. The purpose of this is to couple several telescoping conveyor lines A in tandem, or to couple a telescoping conveyor line at either end to a curved standard conveyor. In addition, it will be noted from Fig. 3 that the rollers 18 in the successive sections are staggered so that they interfit without interference when the conveyor line is telescoped.

Although my invention has been described in considerable detail, such description is intended as being illustrative rather than limiting, since the invention may be variously embodied, and the scope of the invention is to be determined as claimed.

I claim as my invention:

1. An article conveyor comprising a plurality of sections having channel sides, said channel sides being reversed in each successive section, a slide coupling joining any two successive sections, said coupling comprising an inclined plane projecting from the web of the channel side of one section, a horizontally extending portion at the top of said inclined plane, and an inclined lug projecting from the top flange of the channel sides of successive sections, said incline lug engaging said inclined plane when said successive sections are relatively extended whereby the top flange of said successive sections will lie upon said horizontally extending portion.

2. An article conveyor comprising a plurality of U-shaped channel sections, said channel sections being reversed in successive telescopic sections, a slide coupling joining any two successive sections whereby each of the sections will lie in substantially the same plane when extended, said coupling comprising an inclined plane portion mounted upon the web of the channel side of one channel section and extending between the flanges of said channel, and an inclined lug extending from the upper flange of the complementary channel section, said lug being adapted to slide upon said inclined plane portion whereby the telescopic channel sections when extended will lie in substantially the same plane.

3. An article conveyor comprising a plurality of U-shaped channel sections, said channel sections being reversed in successive telescopic sections, a slide coupling joining any two successive sections whereby each of the sections will lie in substantially the same plane when extended, said coupling comprising an inclined plane portion mounted upon the web of the channel side of one channel section and extending between the flanges of said channel, a horizontal portion contiguous to said inclined plane and an inclined lug extending from the upper flange of the complementary channel section, said lug being adapted to slide upon said inclined plane portion whereby the telescopic channel section when extended will lie in substantially the same plane when said upper flange of said complementary channel section rests upon said horizontal portion.

4. The invention of claim 3 wherein a second inclined portion is continguous to said horizontal portion and extends above said horizontal portion, and said lug being adapted to abut said second inclined portion.

JOHN J. McLAUGHLIN.

REFERENCES CITED

The following references are of record in the file of this patent:

UNITED STATES PATENTS

| Number | Name | Date |
|--------|------|------|
| 362,603 | Bringezu | May 10, 1887 |
| 556,934 | Koller | Mar. 24, 1896 |
| 1,935,734 | Twomley | Nov. 21, 1933 |
| 1,949,972 | Murphy | Mar. 6, 1934 |
| 1,959,735 | Phillips | May 22, 1934 |
| 2,379,982 | Mitchell | July 10, 1945 |